United States Patent Office 3,116,630
Patented Jan. 7, 1964

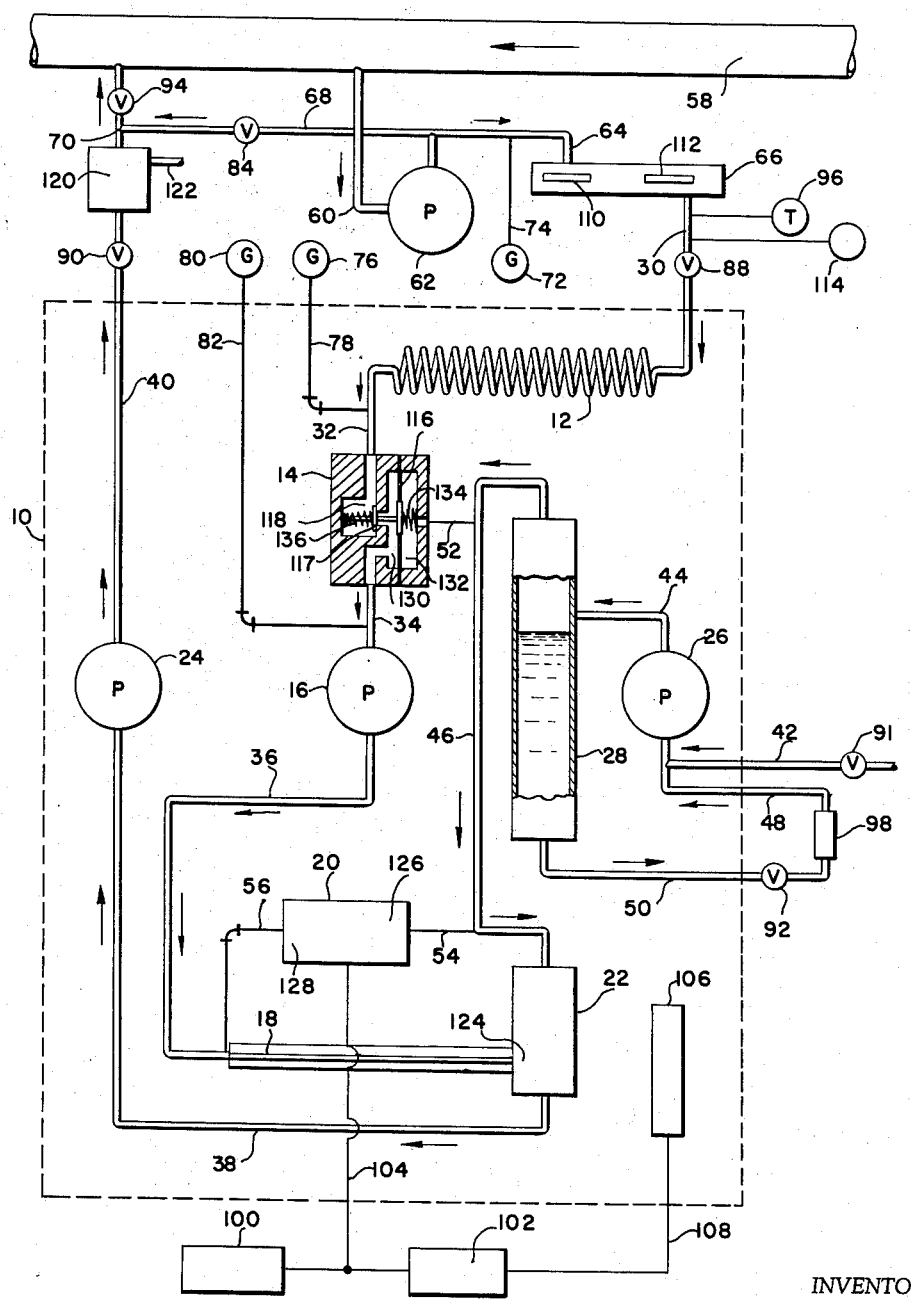

3,116,630
CONTINUOUS VISCOSIMETER
John J. Piros, Homewood, Ill., assignor, by mesne assignments, to Sinclair Research, Inc., New York, N.Y., a corporation of Delaware
Filed July 21, 1960, Ser. No. 44,385
6 Claims. (Cl. 73—55)

This invention is a continuous recording viscosimeter having several important advantages over viscosimeters which have been developed in the past. The device is suitable for use with a pipe line carrying products, such as lubricating oil or crude petroleum, where it is important to keep a constant check on the viscosity of the said products. The device measures changes in viscosity by changes in the pressure drop of a sample flowing through a tube under conditions of constant velocity. Constant velocity is achieved by the use of a pump so arranged with the tube that the pressure drop across the combination is constant. Therefore, the proportion of this constant pressure drop which takes place in the tube varies with the viscosity of the sample and this variation is employed to indicate the viscosity of the sample.

The invention is very sensitive to small fluctuations in viscosity and nullifies the effect of substantially all extraneous variables which could prejudice the viscosity indications. Such extraneous variables which are minimized in this invention are the temperature, vaporization of components of the sample and the effects of gravity and capillarity as well as variations in velocity.

The device maintains a constant temperature by enclosing the sample flow line and the pump and pressure drop tube in a thermostatic bath and providing a temperature equalizing coil. Capillarity effects are minimized by using a relatively large pressure drop tube; gravity effects are minimized by disposing the tube horizontally. Viscosity variations are generally easier to detect and record at somewhat elevated temperatures. However, at such temperatures it is frequently found that part of the sample may vaporize and thus partially invalidate the viscosity readings. To prevent such vaporization the sample is kept under an elevated pressure, in part by the use of compressed air or other gas which is essentially inert under the conditions of operation. The base pressure exerted by the compressed gas is generally higher than the vapor pressure of any constituent in the sample at the temperature of the test and the constant pressure drop mentioned above is the difference between the pressure at which the sample enters the pump and this base pressure. This difference is maintained constant, despite possible variations in the base pressure during the course of the testing procedure, by the use of a differential flow controller. A differential pressure detector, for example, a gauge, is connected across the pressure drop tube and indicates viscosity by comparing the pressure at the entrance to the tube with the above-mentioned base pressure, which is maintained at the exit of the pressure drop tube.

The device comprises a compressed gas flow system and a sample flow system and may use any suitable source of compressed gas to achieve the base pressure; however, the device also provides, in a preferred embodiment, means for pressurizing atmospheric pressure gas or giving additional pressure to partially compressed gas.

The compressed gas is applied to an exit chamber containing one end of the horizontally disposed pressure drop tube. The air pressure is transmitted to the base pressure side of the differential pressure gauge and to the control side of the differential flow controller. The sample flow system includes a pump having a connection through the flow side of the differential flow controller and the temperature equalizing coil to a source of sample outside the tank and a connection to the other, entrance, end of the pressure drop tube. The exit end of the pressure drop tube and the differential flow controller both being subjected to the same base pressure from the compressed gas, the sample passing through the differential flow controller may be subjected to a pressure differing from the gas pressure by a given, constant amount. Conveniently this is done by spring biasing in the differential flow controller.

The device may be connected at two points in parallel to a product pipe line. Generally the sample line will be connected to the viscosimeter by means of a supply pump which may be controllable by manual or other means to give a suitable amount of sample to provide the desired pressure differential across the sample pump and pressure drop tube. However, such control is preferably brought about by providing a relief line, with a flow controller, from just after the supply pump to the sample return line which runs from the exit chamber, out of the tank, to the product line. Also, an exhaust pump may be provided in this line.

Ideally the sample pump, exhaust pump and gas pump, when used, are all submerged in the bath. Also, in this invention, similar pumps may be provided for all fluids, enabling all three pumps to be operated in tandem from one motor. Since pumps for liquids and pumps for gas are generally of widely differing construction, such differences preventing operation of a liquid pump and a gas pump from the same motor without elaborate speed-modifying elements in the transmission, this invention can provide a "lubricating" system which enables a pump, designed to propel liquids, to pump gas.

The invention will be more readily understood from the accompanying schematic drawing which, of course, is to be considered illustrative only and not limiting. In the schematic, lines which conduct a significant amount of fluid are shown as double lines.

The invention comprises an insulated tank 10 which contains a thermostatic fluid such as water or preferably light oil. Essential elements of the viscosimeter contained in the tank are the temperature equalizing coil 12, the constant differential flow controller 14, the oil sample pump 16, the pressure drop tube 18, the differential pressure gauge 20, the exit chamber 22, and flow lines connecting these elements. Preferably the device also includes the exhaust pump 24, the air pump 26, and the lubricant reservoir 28, with associated flow lines for connecting these elements. The flow lines are the sample entrance line 30, the heated sample line 32, the pressurized sample line 34, the pumped sample line 36, the drain line 38, the exhaust line 40, the air entrance line 42, the air and lubricant line 44, the compressed air line 46, the lubricant entrance line 48 and the lubricant recirculating line 50. Essential pressure transmitting lines are the control air pressure transmitting line 52, the base pressure transmitting line 54 and the variable pressure transmitting line 56.

Associated elements outside the oil bath are the product line 58, the sample withdrawal line 60, the supply pump 62, the cool sample line 64, the preheating chamber 66, the relief line 68, and the sample return line 70. Pressure measurements in various parts of the system are made by the use of the cool sample gauge 72, connected to line 64 by the pressure transmitting line 74, heated sample gauge 76 connected to line 32 by pressure transmitting line 78, and pressurized sample pressure gauge 80 connected to pressurized sample line 34 by the pressure transmitting line 82.

Fluid flow and pressure in the various lines are controlled in part by the relief valve 84 in relief line 68, check valve 88 in line 30, the check valve 90 in line 40, the check valve 91 in line 42, the control valve 92 in line 50 and the check valve 94 in line 70. The invention may also be provided with the thermometer 96 for line 30 and the sight glass 98 between lines 48 and 50.

The electrical elements used in the invention include the recorder 100 and the power supply 102 which are connected to the differential pressure gauge 20 by the lead or leads 104, the bath heater 106, connected to the power supply by lead or leads 108, the cartridge preheater 110 and the adjustable temperature switch 112 in the preheating chamber 66 and the pressure switch 114 in the sample entrance line 30.

The flow path for a sample of the liquid passing through the product line 58 is as follows:

The sample is withdrawn from the product line through the sample withdrawal line 60 by the supply pump 62. Generally the pressure of the product line 58 is insufficient for quick and accurate viscosity measurements, so that this pump is called upon to supply the needed sample pressure. The supply pump 62 may preferably be a gear pump. Excess sample is bled back to the product line by the relief line 68, the valve 84 being adjusted to provide sample liquid at the proper pressure, as will be explained below.

The sample passes through the cool sample line 64 to the preheating chamber 66 which heats the sample up to within a degree or two of the bath temperature. This preheating chamber, as pointed out above, contains the cartridge heater 110 and a thermoswitch 112 which controls the electric current to this heater from a power source not shown. The preheating chamber 66 may conveniently be a short length of pipe, for example, half-inch pipe. The incoming sample flows through the annulus between the heater and the inside wall of the pipe. The pressure switch 114 is wired in series with the heater 110 and is adjustable to interrupt the power to the heater in case the pressure drops due to a lack of oil from the supply pump. The thermometer 96 indicates the temperature of the oil in the sample entrance line 30 and aids in adjusting the thermoswitch to its proper control point.

The heated sample passes the check valve 88 and enters the temperature equalizing coil 12. This coil may comprise, for example 15 feet of 3/8" O.D. copper tubing. By the time it reaches the heated sample line 32 the sample has attained the same temperature as the bath.

The constant differential pressure controller 14 is preferably a spring biased mechanism containing a diaphragm, as illustrated, although other devices may be used as will be apparent to one skilled in the art. The particular device illustrated comprises a body having a flexible diaphragm 116 and a flow passage divided by a valve 117 into the entry 118 and the egress 130. On the right hand side of the controller illustrated is the compartment 132 which is in communication with the compressed air line 46 by means of the line 52. The spring 134 in this compartment exerts a pressure to the left, tending to open the valve, while the spring 136 in the entry exerts a pressure to the right, tending to close the valve. The spring 134 exerts a pressure which is a discrete amount higher than the pressure exerted by spring 136 and this discrete amount is the desired pressure drop across the pump and pressure drop tube combination. For example, where it is desired to have a pressure drop of 3 pounds across the pump and tube, the spring 134 may exert a pressure of 17 pounds and the spring 136 a pressure of 14 pounds giving a net spring biasing of 3 pounds tending to keep the valve open. The base pressure, exerted on the diaphragm 116 also tends to keep valve 117 open while the pressure of the sample fluid in egress 130 tends to close the valve.

The valve operation keeps the pressure in egress 130 at a pressure equal to the sum of the base pressure and the net spring biasing. The pressure in the line 32 is regulated by the pump 62 and the valve 84 and in general will be maintained at a pressure higher than total of the base pressure and the differential, that is, higher than the pressure in line 34. The valve 117 automatically adjusts itself to give a pressure drop across the valve sufficient to reduce the pressure of liquid from the pressure found in entry 118, to the amount of pressure required to be maintained in egress 130.

When the pressure on the diaphragm from compartment 130 is maintained equal to the pressure on the other side of the diaphragm, the diaphragm and consequently, the valve, remain stationary, with the valve in an open position. An increase in base pressure tends to open the valve further, thereby lowering the pressure drop across the valve, and raising the pressure of egress 130, to equalize the pressure. Lowering of pressure in entry 118 also causes at first a momentary lowering of pressure in egress 130 and opening of the valve until the proper pressure in 130 is restored.

The opposite phenomena, viz, increased pressure in 118 or decrease in base pressure, tend to close the valve, to increase the pressure drop across the valve.

The sample pump 16 supplies sample to the pumped sample line 36 and pressure drop tube 18 at a constant velocity, for example, 12 liters per hour. The pressure drop tube frequently will have an inside diameter of about 0.05 to 0.5 inch. For a velocity of 12 liters per hour and 100° F. operation with a lubricating oil product varying from 5 to 50 SAE in viscosity, the tube can be, for example, a 6-inch length of stainless steel 0.375 inch O.D. tubing having an inside diameter of 0.256. For 210° F. operation the pressure drop tube could be 6 inches of 0.250 O.D. stainless tubing having 0.145 inch inside diameter. The sample passes through the pressure drop tube 18, and the exit chamber 22 from which it is removed, along with air, by the exhaust pump 24 through the drain line 38. The sample is thence carried by the exhaust line 40, past the check valve 90. The exhaust line 40 may be provided with the pump 120 wherein air may be disentrained from the oil and vented by line 122 before return of the sample through the line 70 to the product line 58. Alternatively, the entire exhaust mixture of sample and air passing through the line 40 may be passed to the product line 58, since the quantity of air is too negligible to affect the quality of the product.

Compressed air at the selected base pressure may be supplied to line 46 by any convenient means, and preferably the air will be at the temperature of the bath. The drawing shows a source of compressed air which conveniently can be built into the device. In this embodiment the air is pressurized to the desired base pressure by means of the pump 26, set in a flow system which allows the use of a pump designed to pump liquids.

The flow path for air to the exit chamber 22 is as follows: Air is drawn into air pump 26 through the valve 91 and the line 42, in mixture with a viscous liquid from line 48. This liquid is called the "lubricant" and enables the pump 26, which is designed to conduct liquids, to conduct air. This mixture passes from the air pump through the air and lubricant line 44, to the lubricant reservoir 28. Preferably the lubricant level in this reservoir is kept below the inlet to the reservoir from the line 44. In the reservoir air is disentrained from lubricant and travels, under the propelling force generated by the pump 26 to the compressed air line 46. Pressure from this line is exerted on differential flow controller 14 through the transmission line 52, on the base pressure side of the differential pressure gauge 20 by the transmission line 54 and on the exit end 124 of the pressure drop tube 18 which is within the exit chamber 22. Air flows to the exit chamber 22 and is withdrawn mixed with sample as described above. The air pump 26 is of a size which gives a base pressure in the lines 52 and 54 and the chamber 22 which is preferably greater than the vapor pressure of any constituent of the sample.

The pump 26 may have a capacity, for example, of about 18 liters per hour at atmospheric pressure. If the sample pump 16 has a capacity of about 12 liters and the exhaust pump 24 is provided to have a capacity of about 18 liters per hour, the 18 liters of air per hour would be compressed to 6 liters per hour in order to be exhausted from exit chamber 22 in the same quantity it is being pumped into line 46. Air in line 46, therefore, would be compressed to such an extent that it exerts a pressure of about 20 p.s.i.g. This is a sufficient base pressure to prevent formation of vapors in most samples at 100° F. To obtain higher air pressures for more volatile samples, a pump of larger capacity may be used.

The lubricant recycle system, which enables the pump 26, which is designed for liquids, to pump air, is obvious from the drawings, and comprises, besides the reservoir 28, the recirculating line 50, the control valve 92 and the sight glass 98.

The preferably insulated tank 10 may have a capacity of, for example 20 gallons and the heating element 106 may have an output of, for example 500 watts. The tank is also advantageously provided with a temperature regulator, stirring motor and perhaps a cooling coil, not shown.

The differential pressure detector, that is, gauge 20, is advantageously sensitive to a pressure differential range of ±1 p.s.i. between the pressure transmission lines 54 and 56. Such a gauge is described, for example, in U.S. Patent 2,720,113. The gauge may function, for example, by including a chamber containing a movable dividing member such as a bellows, not shown, between the base pressure side 126 and the variable pressure side 128 of the gauge 20. This movable dividing member controls for example, a rheostat which may be the variable resistance of a Wheatstone bridge. Such control may be exerted, for example, by the movable dividing member operating a piston outside the chamber, which in turn may operate an unbonded strain gauge. In the U.S. patent mentioned above the strain gauge includes a resistor wire which changes its electrical resistance on being stretched or relaxed. The Wheatstone bridge arrangement is connected by lead or leads 104 preferably to a null recording servoamplifier, which has the ability to return itself automatically to zero recording. At the start of a run the recorder 100 may be set to read as "normal" or "zero" the pressure differential between sides 126 and 128 which occurs when a sample of median viscosity is passed through the tube 18. A more viscous sample will require more pressure for passage through the tube and a higher pressure will be transmitted through line 56 thereby moving the movable dividing member and changing the reading on the recorder 100. Likewise, the passage of a less viscous sample will change the reading in the opposite direction. In any given system, however, there is a constant pressure differential between line 34 and chamber 22 of, for example 3 p.s.i.

I claim:

1. A viscosity measuring device comprising a tank suitable for containing a fluid at a constant temperature and containing a temperature equalizer, a differential flow controller, a pump, a pressure drop tube and an exit chamber arranged for series flow of a liquid sample therethrough, a differential pressure detector and a source of base gas pressure connected to said differential flow controller, said source of base gas pressure connected to said exit chamber and one side of said differential pressure detector to exert the base pressure on the exit of the tube, the other side of said differential pressure detector constituting means to receive pressure transmitted from the entrance to said tube, said differential flow controller comprising means to maintain a constant pressure differential between the pressure at the entrance of said pump and the base pressure.

2. The device of claim 1 in which the source of base gas pressure is a line connected to a pump suitable for propelling liquids which is connected in turn to a source of lubricant and to a source of air.

3. The device of claim 1 in which the differential pressure detector is connected to a means for recording changes in pressure at the entrance to the tube.

4. An apparatus adapted for testing the continuous blending of hydrocarbon stocks of different viscosity to produce a blended stream of desired viscosity which comprises in combination a product line through which the blended product flows, a sample product withdrawal line in communication with said product line, a sample product supply pump in said withdrawal line, a preheating chamber through which sample product passes, a viscosity measuring device into which sample product emerging from said preheating chamber flows, said viscosity measuring device comprising a tank suitable for containing a fluid at a constant temperature and containing a temperature equalizer, a differential flow controller, a pump, a pressure drop tube and an exit chamber arranged for series flow of said product sample therethrough and having an exhaust line for sample discharge, a differential pressure detector and a source of base gas pressure connected to said differential flow controller, said source of base gas pressure connected to said exit chamber and one side of said differential pressure detector to exert the base pressure on the exit of the tube, the other side of said differential pressure detector constituting means to receive pressure transmitted from the entrance to said tube, said differential flow controller comprising means to maintain a constant pressure differential between the pressure at the entrance of said pump and the base pressure and means preventing pressure in said exhaust line from being exerted on said exit chamber.

5. The apparatus of claim 4 in which the exit chamber is connected to a drain line in communication with the exhaust line with an exhaust pump therebetween, said exhaust line being in communication with said product line.

6. The device of claim 1 in which the exit chamber is connected to a drain line in communication with an exhaust line with an exhaust pump therebetween, and means preventing pressure in said exhaust line from being exerted on said exit chamber.

References Cited in the file of this patent

UNITED STATES PATENTS

| | | |
|---|---|---|
| 2,042,860 | Peabody et al. | June 2, 1936 |
| 2,198,325 | Wynn et al. | Apr. 23, 1940 |
| 2,597,138 | Trigg | May 20, 1952 |
| 2,791,902 | Jones | May 14, 1957 |
| 2,834,200 | Rhodes et al. | May 13, 1958 |
| 3,025,232 | Jones | Mar. 13, 1962 |